United States Patent
Remy et al.

[11] Patent Number: 5,931,911
[45] Date of Patent: Aug. 3, 1999

[54] INFORMATION PROCESSING DEVICE ENABLING THE MANAGEMENT OF AN INFORMATION RESOURCE BY AN ADMINISTRATION SYSTEM

[75] Inventors: Christian Remy, Montigny Le Bretonneux; Olivier Miakinen, Vitry S/Seine, both of France

[73] Assignee: Bull S.A., Paris, France

[21] Appl. No.: 08/153,189

[22] Filed: Nov. 17, 1993

[30] Foreign Application Priority Data

Nov. 23, 1992 [FR] France .................................. 92 14021

[51] Int. Cl.$^6$ ..................................................... G06F 13/00
[52] U.S. Cl. ........................... 709/223; 709/230; 710/105
[58] Field of Search ..................................... 395/200, 375, 395/200.53, 200.32, 200.54, 200.6, 285; 370/85.6

[56] References Cited

U.S. PATENT DOCUMENTS

| | | | |
|---|---|---|---|
| 5,133,053 | 7/1992 | Johnson et al. | 395/200.53 |
| 5,175,852 | 12/1992 | Johnson et al. | 47/25 |
| 5,261,044 | 11/1993 | Dev et al. | 345/357 |
| 5,317,568 | 5/1994 | Bixby et al. | 370/401 |
| 5,329,619 | 7/1994 | Pagé et al. | 395/200.33 |
| 5,367,635 | 11/1994 | Bauer et al. | 395/200.51 |

FOREIGN PATENT DOCUMENTS 0278316 8/1988 European Pat. Off. .
0463764 1/1992 European Pat. Off. .

OTHER PUBLICATIONS

Hewlett–Packard Journal, vol. 41, No. 2, Apr. 1990, Palo Alto US,pp. 85–91, XP116179, Atul R. Garg et al.; "Developing A Distributed Network Management Application Using HP OpenView Windows".

Integrated Network Management, 11 Proc. of the IFIP TC6/WG6.6, Apr. 1, 1991 Elsevier, Amsterdam, Netherlands, p. 9–25, Marshall T. Rose "Network Management Is Simple: You Just Need the "Right" Framework!".

*Primary Examiner*—Zarni Maung
*Attorney, Agent, or Firm*—Kerkam, Stowell, Kondracki & Clarke, P.C.; Edward J. Kondracki

[57] ABSTRACT

An information processing device IPD implanted in an information processing resource RES which enables dialog between an administration system MAN and the resource RES, by the agency of a standard protocol such as SNMP and through a network such as TCP/IP. The device PID is constituted on the one hand by a selection and dialog manager DIS including a configuration file CF, and on the other by a set of specific agents A1, A2, . . . , An of the protocol SNMP, the protocol which is also used in the device IPD. The manager DIS receives requests form the system MAN and, after reading the file CF, dispatches them, as a function of the object to which they pertain, to one or more of the agents A1, A2, . . . , An and then receives the responses to the requests sent by the appropriate agents and transmits them to the system MAN.

14 Claims, 2 Drawing Sheets

INFORMATION PROCESSING DEVICE ENABLING THE MANAGEMENT OF AN INFORMATION RESOURCE BY AN ADMINISTRATION SYSTEM

FIELD OF THE INVENTION

The present invention relates to an information processing device, implanted in an information processing resource, to enable dialog between an administration system for objects and said information processing resource, by the agency of in SNMP standard administrative protocol and through a network.

BACKGROUND OF THE INVENTION

Conventionally, a system for administrating objects is tasked with administering various information processing resources, such as an information processing system, a network element, or quite simply applications software. To do so, a dialog is established by the agency of a predetermined standard administrative protocol and through the network, by means of requests sent by the administration system to the information processing resources and responses to these requests made by the information processing resources involved to the administration system. To authorize this dialog, an information processing device especially provided to facilitate performing this task is implanted in each information processing resource. This device is in fact the equivalent of the administration system for the equipment that supports the information processing resource to be administered. These devices are of various types, depending on the type of administrative objects they support and on the administrative protocol they use to communicate with the administration system. One example of such a device is provided by the simple network management protocol agent SNMP, which is described in the document "Simple Network Management Protocol—Internet Working Group Request for Comments 1157", May 1990, and which uses the object model and the administrative protocol defined by the Internet Engineering Task Force (IETF). The SNMP agents support administrative objects standardized by IETF and/or what are known as proprietary objects which are defined by the vendors of the resources to be administered (equipment manufacturers, software developers, etc.). Because the same equipment, and in particular an information processing system, can support various resources to be administered, it is essential to have modular agents capable of handling various sets of objects, called administration or information bases or MIBs (for management information base), representing the various resources to be administered in the equipment. Initially, the agents were developed entirely as a function of the objects to be supported, and administering a new resource was a tedious process that required adding a new MIB and hence required new development to expand the corresponding agent. With a view to simplifying such expansions, various mechanisms have recently been defined. In a first step, the simplification has consisted of defining program interfaces among the agents to enable dialog between the core (the common portion, independent of the objects, that handles the dialog with the administration system, error handling, formatting the data, and so forth) and various MIBs of the device, which has made it possible to facilitate the development of new objects. Hence when there is a need to administer a new resource with a given agent by a given protocol, this resource must be modelized, which translates into a set of objects or MIBs to be defined by using the modes of definition provided for by the standards. In this approach, as described for instance in the document entitled "CISCO MIB", CISCO Systems, Inc., November 1989, the objects are defined in accordance with the methods or the formal procedure of the standard, but the objects themselves are not standard, and the result is that each manufacturer develops a set of objects specific to him. Under these conditions, the dialog between an administration system and a plurality of resources of different manufacturers is impossible to do automatically and requires the use of a plurality of administration systems, each one managing a set of resources specific to one manufacturer and requiring the possibly time-consuming and expensive development of additional software to enable manipulating and reconfiguring virtually all of a device for processing the information employing the agents.

Moreover, manufacturers and users show a strong inclination toward developing an increasingly large number of MIBs as well as integrating all the existing MIBs, which given the heterogeneity of the various resources singularly complicates the task. With a view to at least partially solving this growing problem, provision has been made in a second step for the implanting of MIBs in subagents, carrying out dialog with a generic agent by a defined protocol. In that case, implanting new objects requires only the development of a subagent. One such architecture is used by IBM, for example, and is described in the document "SNMP MUX Protocol and MIB", by Marshall T. Rose, May 1991; an SMUX protocol is used for dialog between the core and the subagents of the device. The SMUX protocol was chosen because of its simplicity of development, but it has a major disadvantage because it cannot coexist with other structures of agents and it requires the use of this technique and hence the develop of other subagents (dialoging by this SMUX protocol) to authorize the processing of information specific to the resources of other manufacturers.

Heretofore present, the problems resulting from the transparency of the administration of information processing resources of different origins have been significant.

SUMMARY OF THE INVENTION

The object of the present invention is to overcome these disadvantages, and the invention provides an information processing device that enables the administration system to have a homogeneous global view of the various heterogeneous resources and thereby achieving an integral transparency with respect to the use of these heterogeneous resources that carry on dialog in accordance with an SNMP predetermined administrative protocol.

To do so, the information processing device of the present invention includes dispatching and dialog management means including among other elements a configuration file, and a set of specific standard agents of the predetermined administrative protocol, which is also used in the present device, each agent supporting a set of objects, the dispatching and dialog management means receiving requests from the administration system, and after reading the configuration file dispatching them, as a function of the object to which they pertain, to one or more appropriate agents, then receiving the responses to the requests from the appropriate agent or agents and transmitting them to the administration system.

Hence, the present invention enables the same SNMP administrative protocol to be used in the information processing device as is used for the dialog between the administrative system and this device, and also provides dispatching and dialog management means that make it possible without ambiguity, by reading the configuration file, to direct the requests to the agents involved, each of the agents implementing a specific set of objects. In this way, the administration system can have a homogeneous, global view of all the various information processing resources. Without encountering difficulties, a user can automatically utilize a heterogeneous array of resources, because the dispatching and dialog management means behave in a completely transparent manner relative to the administration system. Hence in certain applications, for example, there is no need to know the origin of the elements being manipulated; these elements may involve different resources, such as TCP/IP, OSI, DSA, etc.

It should also be noted that the idea of using the same SNMP protocol in the information processing device as the standard administrative protocol, which is complex by definition, runs counter to a prejudice in the industry. It is this prejudice that, in the prior art for instance, accounts for the use of a protocol such as SMUX, which a priori is much simpler to use but is specific to a structure or agent and moreover is non-standard. On the contrary, various significant, unexpected advantages are provided by overcoming this prejudice with the information processing device in accordance with the architecture claimed herein. In fact, such an architecture makes it possible to accept in an executable form, hence in binary form, and integrate an existing standard agent into a resource without having to modify the code of this agent in any way. The only operation to be performed is to describe the objects supported by this agent in the configuration file of the dispatching and dialog management means. When the objects have a treelike structure, as is generally the case, one line in the file is then sufficient to describe these objects. The device according to the invention can thus advantageously utilize agents developed by platform or equipment manufacturers, with all of the agents coexisting in the same equipment such that they are transparent to the administration system. It is also possible to develop sets of objects or MIBs in modular fashion, in independent agents. Similarly, a user can add a new set of objects or MIBs to the device of the invention by developing an agent himself, using any arbitrary technology, since the agent developed meets the specifications of the standard protocol used. The objects involved can then represent applications, such as messaging, transaction-oriented operations, data bases, etc. Finally, the present device can advantageously process requests asynchronously, when the dispatching and dialog management means have accomplished the transmission of a request to an agent; the agent processes it, during which these means can route a different request to a different agent, which performs its processing in parallel with the first. From the standpoint of the administration system, the device of the invention processes a plurality of requests simultaneously. This last advantage is especially significant when processing requests prove to take a long time.

BRIEF DESCRIPTION OF THE DRAWINGS

The following description in conjunction with the accompanying drawings, all given by way of non-limiting example, will provide a complete understanding of how the preferred embodiments of the present invention can be achieved.

DETAILED DESCRIPTION OF THE
PREFERRED EMBODIMENT

Figure 1:
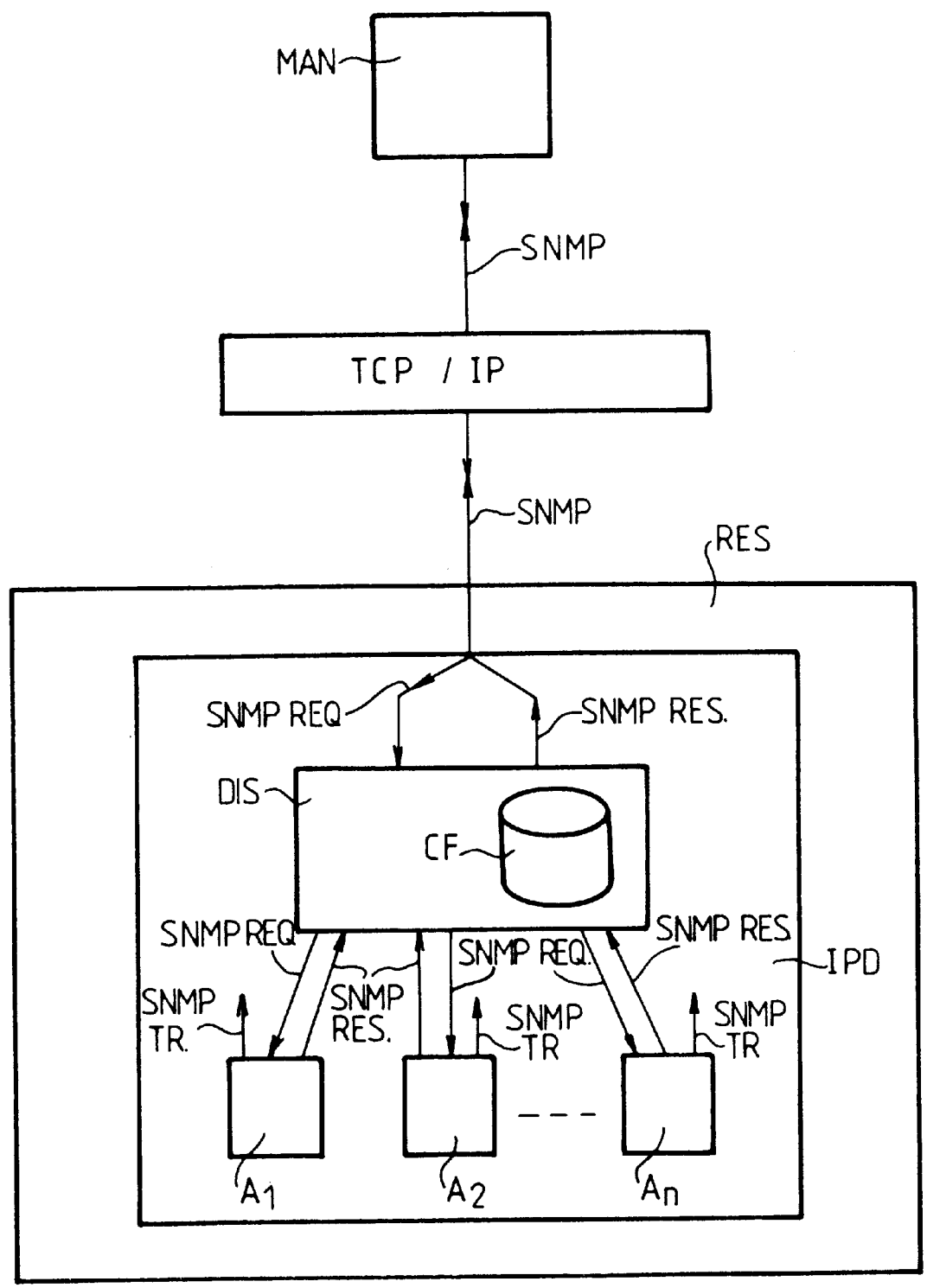
FIG. 1 schematically shows an exemplary embodiment of the information processing device of the invention.

In FIG. 1, an exemplary architecture of the information processing device IPD according to the invention is proposed. In general, both the IPD devices, also known to one skilled in the art as agents, and the administration systems are based on a model of administrative objects that makes it possible to represent the real world (systems, communications software, etc.) by means of abstract objects organized in an administration data base currently known as MIB. In a preferred exemplary embodiment of the present invention, the administration system is made up of a set of applications using operations of the OSI CMIS (for common management information service) model to manipulate the objects of the MIBs, supported by different species of agents, such as DSAC agents (a model developed in accordance with the distributed system architecture by BULL), SNMP agents, and CMIP agents (for common management information protocol).

These various agents are defined in accordance with different object models, and consequently the administration system must make a conversion, by means of components known as integrator agents, between the ISO object model and the object model specific to the network concerned.

As has been explained above, the SNMP agents use an administrative protocol that has been defined by IETF. This protocol has been designed to furnish only base management means, based on the one hand on a limited administrative service that uses only four primitive functions (GET, SET, GET-NEXT, TRAP), and on the other on a simple object model.

A standard MIB has also been defined to enable managing the TCP/IP protocol, but this protocol can be expanded in an experimental and/or proprietary manner. The current version of this MIB is known as MIB II.

The expansion mechanisms used have as their subject the definition and implementation of the various proprietary MIBs, which typically involve network equipment such as bridges, routers, central computers, concentrators, and so forth.

Currently, the increasingly great number of embodiments of administration systems and SNMP agents leads SNMP administration users to develops ever-expanding and more-complex domains for the administration of systems, and even applications.

As has been mentioned above in a general way, in the present example the SNMP agents communicate with the administration system by way of the integrator agent, in this case of the SNMP type, which converts the specific object or SNMP operations into a standard object model or standard CMIS operation. In this way, the CMIS operations required to execute requests sent by the applications are converted into SNMP operations and transmitted to the agent involved. Similarly, when a response is received, it is also converted into a response to a corresponding CMIS operation and sent to the application involved. In addition, functions of the notification type (TRAP functions) are converted into alarms and transmitted to the communications infrastructure.

SNMP objects are represented in the administration system by an MIB in an OSI standard. The principle known as "mapping" consists of defining classes of objects administered in order to characterize groups, tables and table entries, the other SNMP objects being the attributes of these classes of objects administered.

The IPD device is then implanted in an information processing resource RES in order to authorize, by way of the standard administrative protocol SNMP and through the TCP/IP network, the dialog between the objects administration system MAN (described in more detail in conjunction with FIG. 2) and the resource RES. In accordance with the concept of the invention, the device IPD is notable in that it consists on the one hand of dispatching and dialog management means DIS including among other elements a configuration file CF, and on the other by a set of standard agents A1, A2, . . . , An specific to the administrative protocol SNMP, which is also used in the device IPD, each agent A1, A2, . . . , An supporting a set of objects, the means DIS receiving requests SNMP.REQ originating from the system MAN, and after reading the configuration file CF, dispatching them as a function of the object to which they pertain to one or more appropriate agents (A1, A2, . . . , An), then receiving the responses SNMP.RES to the requests originating in the appropriate agent or agents (A1, A2, . . . , An), and transmitting them to the system MAN.

This kind of architecture of the device IPD means that the administration system MAN views the means DIS as a standard SNMP agent and can completely ignore the existence of the different agents A1, A2, . . . , An. Only the means DIS know the agents A1, A2, . . . , An, and selectively transmit to them the requests by dispatching each among them to the one (or ones) concerned. To do so, the means DIS use the configuration file CF, which advantageously includes a table that describes the various objects supported in the agents, with their corresponding addresses. This table is constructed upon startup of the means DIS. Furthermore, each agent can transmit an alarm SNMP.TR by using the function TRAP.

In addition, one feature of the invention, is that the configuration file CF includes a temporizer, whose duration is adjustable for each agent and is adapted as a function of the objects to which the requests pertain. In fact, when the system MAN sends a request addressed to a predetermined agent or agents that support the object or objects concerned, the time for obtaining the response may be variable, depending on the object or objects to which the request pertains. Similarly, when an agent receives the request, it may for example have to address itself to other equipment by using a different protocol and consequently ask for network access; processing is then more complicated, and the time for response to this type of request is clearly much longer, which is why the time-out period must be adjustable and is defined in the configuration file for each type of agent.

The device according to the invention also makes it possible to solve different specific problems. Hence a request that originates in the system MAN, may in the simple case pertain to an object or a plurality of objects supported by the same agent; this request is then dispatched to the object or the various objects involved, after the configuration file CF has been read. However, the request from the system MAN may also pertain to a plurality of objects supported by different agents, and this case is then more complex to process because it is necessary to be able to send this request to the various agents concerned and to collect the various responses to form only one in order to transmit it to the system MAN. Thanks to the structure of the device according to the invention, the problem is advantageously solved; this device IPD makes it possible to process a request originating from the system MAN and pertaining to a plurality of objects supported by different agents, in the following manner. The means DIS then directs the requests to the first object involved in the first agent involved, and then successively to the other objects involved that are supported in the other agents involved, and after having received the various responses from the plurality of objects supported by the different agents, they combine these responses into one unique response to the request from the administration system, this unique response then being transmitted to the administration system MAN.

Another problem arises when the system MAN sends a request that pertains to the search for the next object, for example by means of the primitive function GET-NEXT, and this next object is the first one supported by the next agent, because the set of objects supported by the previous agent has already been processed. In this particular case, once again, the notable structure of the device IPD advantageously makes it possible to solve this problem of automatic searching, because reading the configuration file CF immediately shows how the request should be directed and authorizes dispatching it to the proper agent supporting the object in question.

The device IPD is accordingly made up of two distinct parts. The first part consists of the means DIS, which are completely independent of the agents A1, A2, . . . , An, and whose principle functions are to handle the coding and decoding of requests by the SNMP protocol, the access operations for communicating the requests, and the main loop that authorizes listening to the requests. The second part corresponds to the various MIBs supported by the agents A1, A2, . . . , An, the implementation of the MIBs being named in accordance with object method terminology.

Because of its modular structure, such an architecture makes it possible to develop new agents and hence new MIBs without difficulty, or to easily integrate the existing MIBs, regardless of the technology used, if the agent developed or integrated meets the specifications of the SNMP protocol.

To facilitate MIB development and implementation, to enable its integration into any arbitrary administered resource, and in fact to assure interoperability with the administration system, a method of implementing the agents of the device IPD is advantageously used.

In a first step of this implementation method, the set of objects administrated that is to be supported is defined; in a second step, this set of objects is carried to the information processing resource involved; in a third step, the set of objects is designed and implemented; in a fourth step, the set of objects is tested locally; in a fifth step, the set of objects is retrieved and hence supported by the administration system; in a sixth step, the agent that supports the set of objects is integrated with the set of other agents of the information processing device after having been described in the configuration file of the dispatching and dialog management means; in a seventh step, the interoperability between the administration system and the thus-integrated agent is tested, while the final step enables validating this thus-designed and tested agent.

Hence, the first step consists of defining the new agent or the new MIB to be integrated with all the existing agents. By the standard defined by the IETF, an MIB covers only the administration of the layers of the TCP/IP protocol and its nearby environment, and it is also generally necessary to define new sets of objects in order to be able to handle the administration of other functions, which are then considered to be either "proprietary" MIBs or "experimental" MIBs. However, since a large number of computer manufacturers and network equipment vendors themselves define such MIBs to enable the administration of similar products, it is sometimes possible to achieve their integration from the published MIBs, and in a terminal phase to process them in such a way that they completely meet the requirements and hence the specifications of the protocol used.

In any case, the resource to be administered must be analyzed to determine the typical and pertinent characteristics that can be modeled in conformity with the object model developed for the protocol used, in such a way as to afford a precise administrative view of the function.

The step of defining the MIB involves essentially the functional analysis of the resource to be modeled; examination of the processing to be done must preferably be assured by the equipment tasked with the administration of the resource, and in particular the description of the MIB in the proper format for the protocol must be done in order to verify the conformity of this processing.

The second step of this method relates to the carrying and hence adapting the agent to the administered resource. The application of the MIB to the resource does of course assume the existence of an IPD device.

The third step involves the design and implementation of object methods.

The fourth step consists of a local test of the agent by means of commands that authorize the transmission of requests by the protocol provided; these commands may be sent either from the resource itself or from the administration system by way of generic applications, once the MIB has been described in the proper format (in this case after the fifth step).

The fifth step involves the retrieval of the MIB by the administration system; the objects of the MIB must have been described in the proper format to be manipulated by the applications of this administration system. One of the tools of this system makes it possible to convert the MIB into a corresponding MIB in the standard format.

Once it has been locally tested and validated, the agent that supports all the objects and hence the MIB is integrated, in a sixth step, with the other agents of the IPD device. To achieve this integration, the only operation required consists of describing the MIB supported by this agent in the configuration file CF of the means DIS.

The seventh step makes it possible to test the interoperability between the administration system of the agent, information being exchanged in both directions in order to accomplish this test, while in the eighth and last step, the agent thus designed and tested is validated, no longer only locally but also globally in the environment that includes the information processing resource and the administration system.

Figure 2:
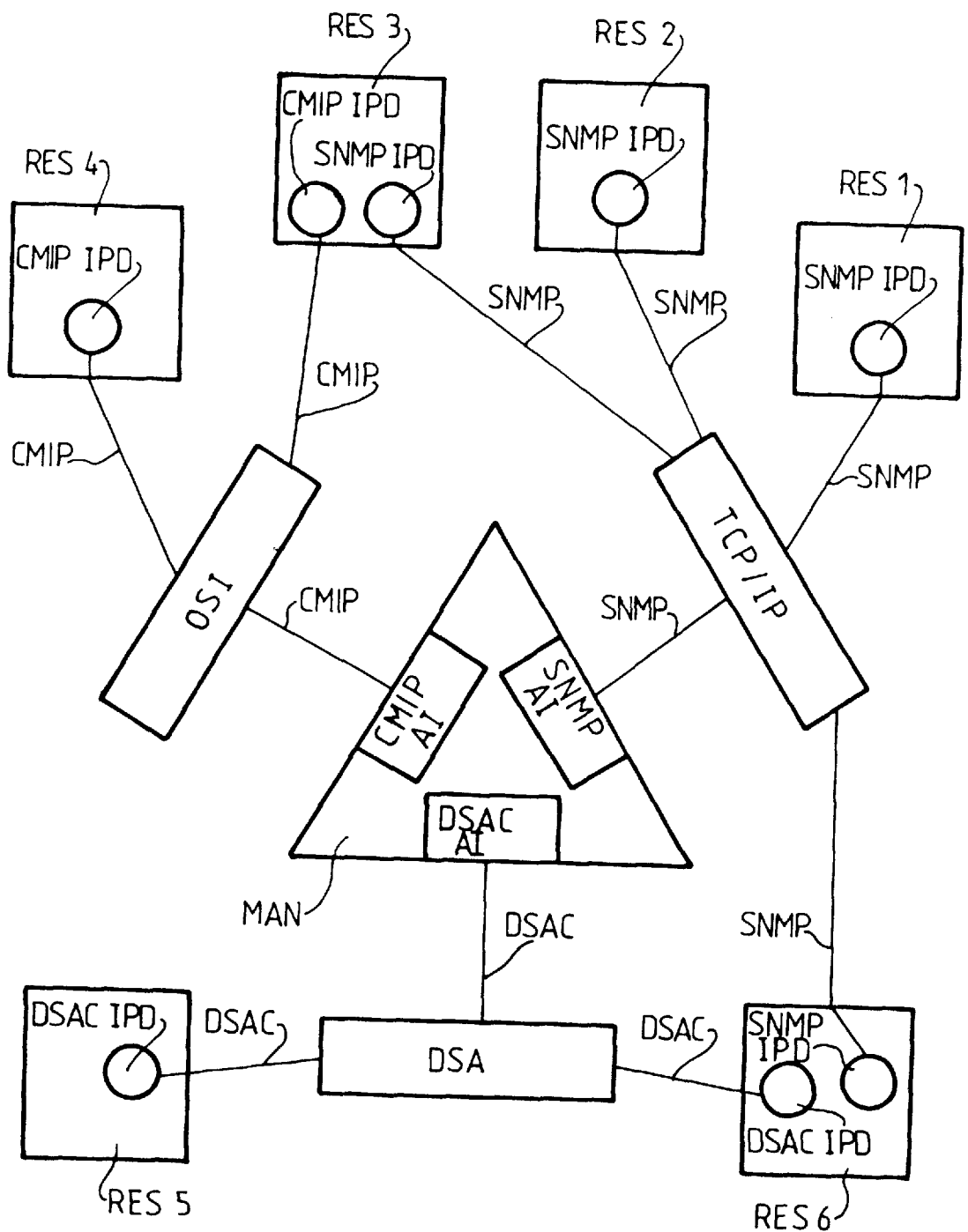
FIG. 2 substitute an example of a complex network, managed by a single administration system in accordance with the present invention.

One example of a complex network administered by a single administration system MAN is proposed in FIG. 2. The administration system MAN is preferably used in a distributed management environment that integrates the administration of systems, networks, and user applications. In this example, the MAN system is an ISM (integrated system management) platform, which furnishes a centralized administrative view of all the resources of the network and of activities or movements in the network, that is, on the one hand the network infrastructure with respect to the equipment and software, and on the other, the information processing systems in terms of hardware, operating systems, and applications.

Generally, the integrated management of the ISM systems proposes administration applications that enable analysis and monitoring of these resources and functions required in order to adapt them to the needs of the users, based on the management information developed, which is maintained by specific management units of the resources that are known as agents. The agents communicate with the ISM platform and hence the system MAN by way of standard administration protocols.

In the example of FIG. 2, the administration protocols supported by ISM are SNMP, CMIP and DSAC (for the sake of compatibility with earlier Bull products and the Bull distributed system architecture).

Hence in a general manner, when an administration component is desired to be used, it is necessary to design and implement an agent to support the administrative objects that it includes, this agent using either the SNMP protocol or the CMIP protocol to communicate with the ISM platform and hence with the administration system MAN.

A plurality of resources may be administered by way of the SNMP protocol in the present integrated management application of ISM systems, thus for example the stacks of the TCP/IP that are represented by all the objects marked MIB II by the standard defined by IETF, various systems such as GCOS7 or GCOS8, or systems under UNIX (trademark of UNIX System Laboratories, Inc.) work group servers, data bases such as Oracle (trademark of Oracle Corporation), and so forth.

In accordance with the present invention, resources foreign to the specific architecture of the integrated systems management ISM can also be administered, beginning at the moment when they meet the requirements of the specifications of the standard protocol used, such as SNMP in this case. Hence the platform ISM, that is, the system MAN, administers all the administratable resources in accordance with the SNMP protocol; computers or equipment such as routers, bridges, etc. use either standard objects or proprietary objects, that is in this case proprietary MIBs. In the present example, "ISM" or "non-ISM" agents are accordingly managed and coexist and can be integrated in the same resource, when they conform to the SNMP protocol. Furthermore, every user must be able to design and implement proprietary MIBs in order to administer his own applications, for instance, without additionally modifying the "ISM agent", at least with respect to the source code.

The method of implementing an agent takes into account the exigencies of processing in order on the one hand to support developments that were made autonomously but relate to MIBs that correspond to them, and on the other to enable the integration of the various SNMP agents resulting from its separate developments in the same resource.

The administration system MAN, shown in FIG. 2, manages a set of resources RES1, RES2, . . . , RES6 through different networks and by different protocols. The system MAN has a homogeneous vision of all the resources and/or applications of the complex network, but since the various IPD devices and the various agents are designed for different object models, the system MAN must make a conversion, by means of integrator agents, between the ISO object model and the object models specific to the networks in question. Hence in this example, the integrator agent CMIP AI performs a conversion of the model of objects relating to the CMIP protocol through the OSI network; the integrator agent SNMP AI makes it possible to convert the model of SNMP objects through the TCP/IP network; and the integrator agent DSAC AI authorizes the conversion of the model of objects that meet the DSAC protocol through the DSA network. In this way, the resource RES1, for instance a bridge, is administered through the TCP/IP network by the SNMP protocol, and dialog with the system MAN is permitted in accordance with the concept of the invention, thanks to the information processing device SNMP IPD. The resource RES2, for example a system under UNIX but not using the integrated services management ISM, also includes an SNMP IPD device enabling dialog by the SNMP protocol with the system MAN through the TCP/IP network. The resource RES3 may be a system under UNIX using the integrated services management ISM, which has on the one hand a SNMP IPD device for dialog by SNMP with the system MAN through the TCP/IP network, and on the other a CMIP IPD device for dialog by the CMIP protocol with the system MAN, but through the OSI network. The resource RES4 is an information processing system of any arbitrary kind for example, using the services CMIS and has a CMIP IPD device for dialog by CMIP with the system MAN through the OSI network. The resource RES5 may correspond to a DSA node, such as DATANET; it has a DSAC IPC device for dialog with the system MAN through the DSA network by the DSAC protocol. Finally, in FIG. 2, the resource RES6 may be a host system, for example a DPS7, which uses on the one hand a DSAC IPD device for dialog with the system MAN through the DSA network by the DSAC protocol, and on the other, an SNMP IPD device for dialog with the system MAN through the TCP/IP network by the SNMP protocol.

In conclusion, the information processing device IPD and the method of implementation of agents for integration in this device are usable directly and advantageously as described and claimed. The implantation of the device according to the invention in each of the resources to be administered enables a user of the administration system to have a homogeneous representation of the complex world to be administered. For example, this user, who works in front of a screen, can manipulate various elements without even knowing whether these elements involve a TCP/IP network, an OSI network, or a DSA network. A single administration system is consequently necessary, and making the network uniform can be done by developing and easily integrating agents in accordance with the present method of implementation in the device according to the invention, without being a prisoner of one technology.

We claim:

1. An information processing device, implanted in an information processing resource, for enabling dialog between an administration system for objects and said information processing resource, by the agency of a SNMP administrative protocol and through a network, said information processing device comprising dispatching and dialog management means including a configuration file, and a set of specific agents of the SNMP administrative protocol being used in said information processing device, wherein each SNMP agent supports a set of objects, said dispatching and dialog management means being operable to receive requests from the administration system, and after reading said configuration file dispatching said requests, as a function of an object to which said requests pertain, to at least one of said SNMP agents, said dispatching and dialog management means further being operable to receive responses to said requests from said SNMP agents and transmit said responses to said administration system and enables the transmission of a request to a first SNMP agent which is process said request during which said dispatching and dialog management means id operalbel to route a second request to a seocnd SNMP agent that then processes said second request in parallel with the first SNMP agent.

2. The information processing device of claim 1, wherein said information processing device authorizes a synchronous handling of said requests.

3. The information processing device of claim 2, wherein said configuration file of the dispatching and dialog management means contains a table describing various objects supported by said SNMP agents and corresponding addresses thereof, said table being constructed when said dispatching and dialog management means are started up.

4. The information processing device of claim 3, wherein said configuration file further includes a temporizer having a duration which is adjustable for each SNMP agent and is adapted as a function of the objects to which the requests pertain.

5. The information processing device of claim 1, wherein said configuration file of the dispatching and dialog management means contains a table describing various objects supported by said SNMP agents and corresponding addresses thereof, said table being constructed when said dispatching and dialog management means are started up.

6. The information processing device of claim 5, wherein said configuration file further includes a temporizer having a duration which is adjustable for each SNMP agent and is adapted as a function of the objects to which the requests pertain.

7. The information processing device of claim 6, wherein said device enables processing of a request originating in the administration system pertaining to a plurality of objects supported by different SNMP agents, said dispatching and dialog means being operable to direct said request to a first object of a first SNMP agent which supports said object, then successively to other objects which are supported by other SNMP agents, and after having received various responses from the plurality of objects, combining said various responses into a unique response to said request from the administration system, which unique responses is then transmitted to said administration system.

8. The information processing device of claim 7, wherein when a request pertains to a search for a next object and said next object is a first object supported by a next SNMP agent, said device makes it possible to proceed to automatically read said next object after reading said configuration file, said request then being authorized and dispatched to an SNMP agent supporting the object involved.

9. In the information processing device as defined in claim 1, a method for implementing an SNMP agent of the information processing device, comprising the steps of defining said set of objects administrated that are to be supported by said SNMP agent; sending said set of objects to the information processing resource; designing and implementing said set of objects; locally testing said set of objects; retrieving said set of objects; supporting said set of objects by the administration system; integrating said SNMP agent that supports the set of objects with other SNMP agents of the information processing device after describing said set of objects inn said configuration file of the dispatching and dialog management means; testing the interoperability between the administration system and the integrated SNMP agent; and validating the tested SNMP agent.

10. The method as defined in claim 9, wherein said information processing device authorizes asynchronous handling of said requests, and further wherein said dispatching and dialog management means enables the transmission of a request to a first SNMP agent, which is to process said request, during which said dispatching and dialog management means is operable to route a second request to a second SNMP agent that then processes said second request in parallel with the first SNMP agent.

11. The method as defined in claim 9, wherein said configuration file of the dispatching and dialog management means contains a table describing various objects supported by said SNMP agents and corresponding addresses thereof, said table being constructed when said dispatching and dialog management means are started up.

12. The method as defined in claim 11, wherein said configuration file further includes a temporizer having a duration which is adjustable for each SNMP agent and is adapted as a function of the objects to which the requests pertain.

13. The method as defined in claim 12, wherein said information processing device enables administration system pertaining to a plurality of objects supported by different SNMP agents, said dispatching and dialog means being operable to direct said request to a first object of a first SNMP agent which supports said object, then successively to other objects which are supported by other SNMP agents, and after having received various responses from the plurality of objects, combining said various responses into a unique response to said request from the administration system, which unique response is then transmitted to said administration system.

14. The method as defined in claim 13, wherein when a request pertains to a search for a next object and said next object is a first object supported by a next SNMP agent, said device makes it possible to proceed to automatically read said next object after reading said configuration file, said request then being authorized and dispatched to an SNMP agent supporting the object involved.

* * * * *

UNITED STATES PATENT AND TRADEMARK OFFICE
CERTIFICATE OF CORRECTION

PATENT NO. : 5,931,911
DATED : August 3, 1999
INVENTOR(S) : Remy et al

It is certified that error appears in the above-identified patent and that said Letters Patent is hereby corrected as shown below:

IN THE CLAIMS:

Claim 1, line 60, after "agent" insert -- , --

Claim 1, line 61, after "is" insert -- to --

Claim 1, line 62, "id" should read -- is --

Signed and Sealed this

Twenty-eighth Day of November, 2000

Attest:

Q. TODD DICKINSON

*Attesting Officer*   *Director of Patents and Trademarks*

UNITED STATES PATENT AND TRADEMARK OFFICE
CERTIFICATE OF CORRECTION

PATENT NO : 5,931,911
DATED : August 3, 1999
INVENTOR(S): REMY et al

It is certified that error appears in the above-identified patent and that said Letters Patent is hereby corrected as shown below:

IN THE ABSTRACT:
"PID" should read -- IPD--

IN THE CLAIMS:
Claim 9, line 53, "inn" should read --in--

Signed and Sealed this

Sixth Day of March, 2001

Attest:

NICHOLAS P. GODICI

Attesting Officer     Acting Director of the United States Patent and Trademark Office